Inventors
Arthur A. Scarlett
Stephen M. Young
By Paul O Pippel
Atty.

Dec. 28, 1943.   A. A. SCARLETT ET AL   2,337,773
FIELD CULTIVATOR
Filed July 5, 1941   3 Sheets-Sheet 2

Inventors
Arthur A. Scarlett
Stephen M. Young
By Paul O. Pippel
Att'y.

Dec. 28, 1943. A. A. SCARLETT ET AL 2,337,773
FIELD CULTIVATOR
Filed July 5, 1941 3 Sheets-Sheet 3
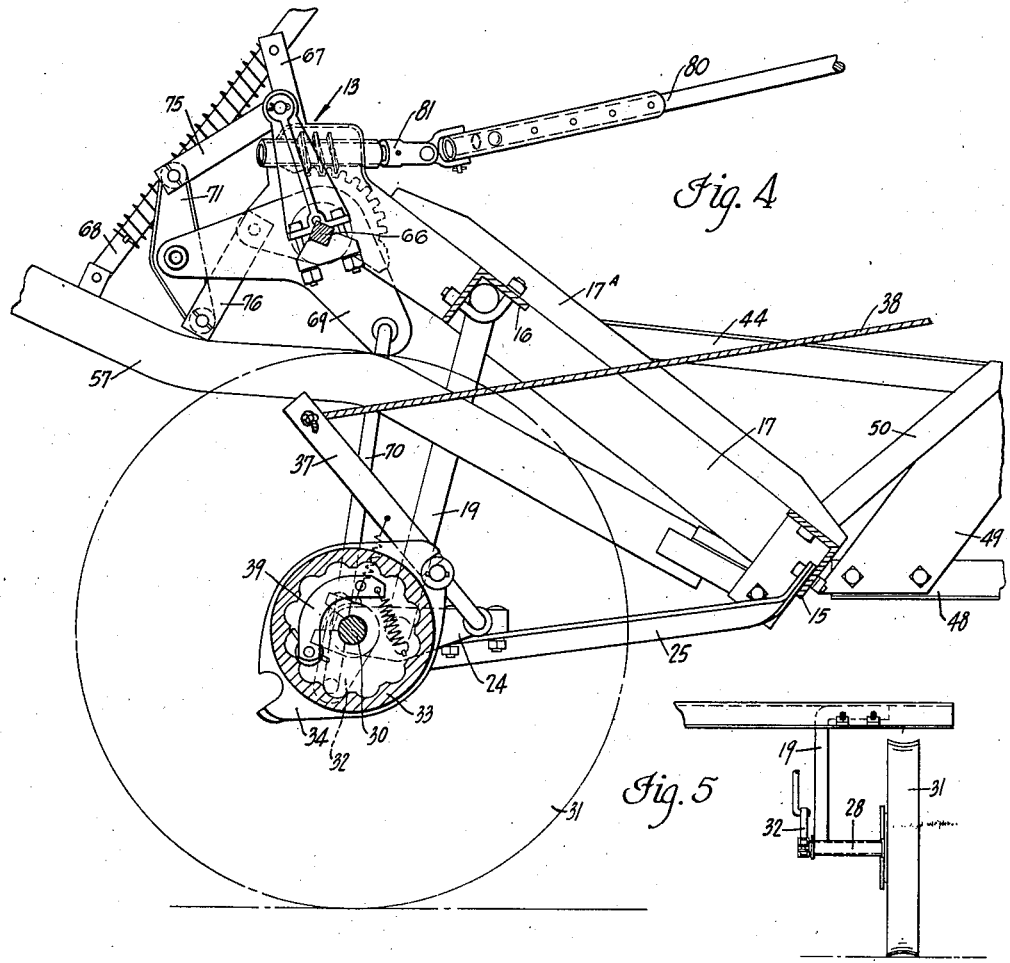
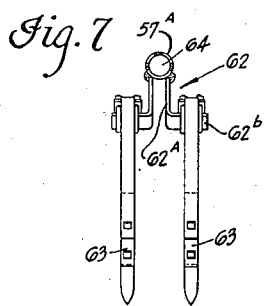
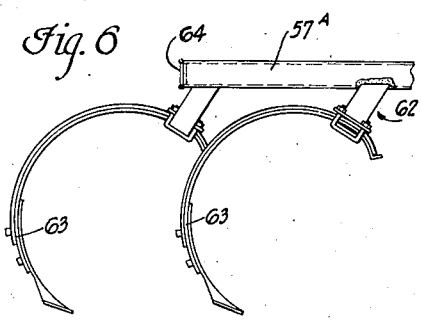
Inventors
Arthur A. Scarlett
Stephen M. Young
By Paul O. Rippel
Atty.

Patented Dec. 28, 1943

2,337,773

UNITED STATES PATENT OFFICE 2,337,773

FIELD CULTIVATOR

Arthur A. Scarlett and Stephen M. Young, Hamilton, Ontario, Canada, assignor, by mesne assignments, to International Harvester Company, Chicago, Ill., a corporation of New Jersey Application July 5, 1941, Serial No. 401,144

10 Claims. (Cl. 97—72)

This invention relates to improvements in the construction and operation of field cultivators. In this type of cultivator, a plurality of cultivator rigs having earth-working tools mounted thereon are movably mounted adjacent one another on the frame of the machine in such a manner that a strip of ground the width of the machine may be cultivated.

It is an important object of the present invention to provide a manually adjustable constant height lift depth regulator means and a power lift mechanism operatively connected to the cultivator rigs in such a manner that the rigs may be readily adjusted to various working depths and raised by power from any working depth to a constant height.

Another object of the present invention is to provide a field cultivator construction which will permit two or more cultivators to be connected together in end to end relation so that a strip of ground the width of two or more machines may be cultivated.

A further object of the present invention is the provision of a light weight but torsionally strong cultivator rig.

An additional object of the present invention is the provision of a novel means for mounting spring teeth on the novel cultivator rig.

According to the present invention, the above mentioned desirable objects are achieved by the following construction. A manually adjustable constant height lift depth regulator is mounted on the machine and operatively connected to the rigs in such a manner that the rigs may be readily adjusted to any desired operating depth. A power-lift mechanism is mounted adjacent and driven from one of the supporting wheels and is operatively connected to the depth regulator for raising and lowering the rigs by power. The regulator always lifts the rigs to a constant height. The cultivators may be connected together in end to end relation, since the supporting wheels are mounted inwardly from the ends of the cultivator frame on a novel wheel supporting means. The cultivator rigs are made of pipe which is light in weight and torsionally strong. Either stiff or spring teeth may be used on the rigs. In case spring teeth are used, a novel carrying member is provided on the pipe and the end of the pipe is strengthened by welding a plug over the rear end thereof.

By this particular arrangement of parts, a compact, light weight, and efficient field cultivator is provided which is especially advantageous, since it may be supplied to the trade at a low price.

These and other objects and advantages of the present invention will be apparent to those skilled in the art after a consideration of the following detailed description of the preferred structural embodiment, taken in conjunction with the accompanying drawings.

In the drawings:

Figure 4 is a sectional side view similar to Figure 3 but shows the parts referred to in Figure 3 in a raised position;

Figure 5 is a rear view of one end of the machine and shows the novel wheel supporting means therefor;

Figure 6 is a side view of one of the cultivator rigs and shows the novel means for securing the spring teeth thereto; and, Figure 7 is a rear view of the structure shown in Figure 6.

Figure 1:
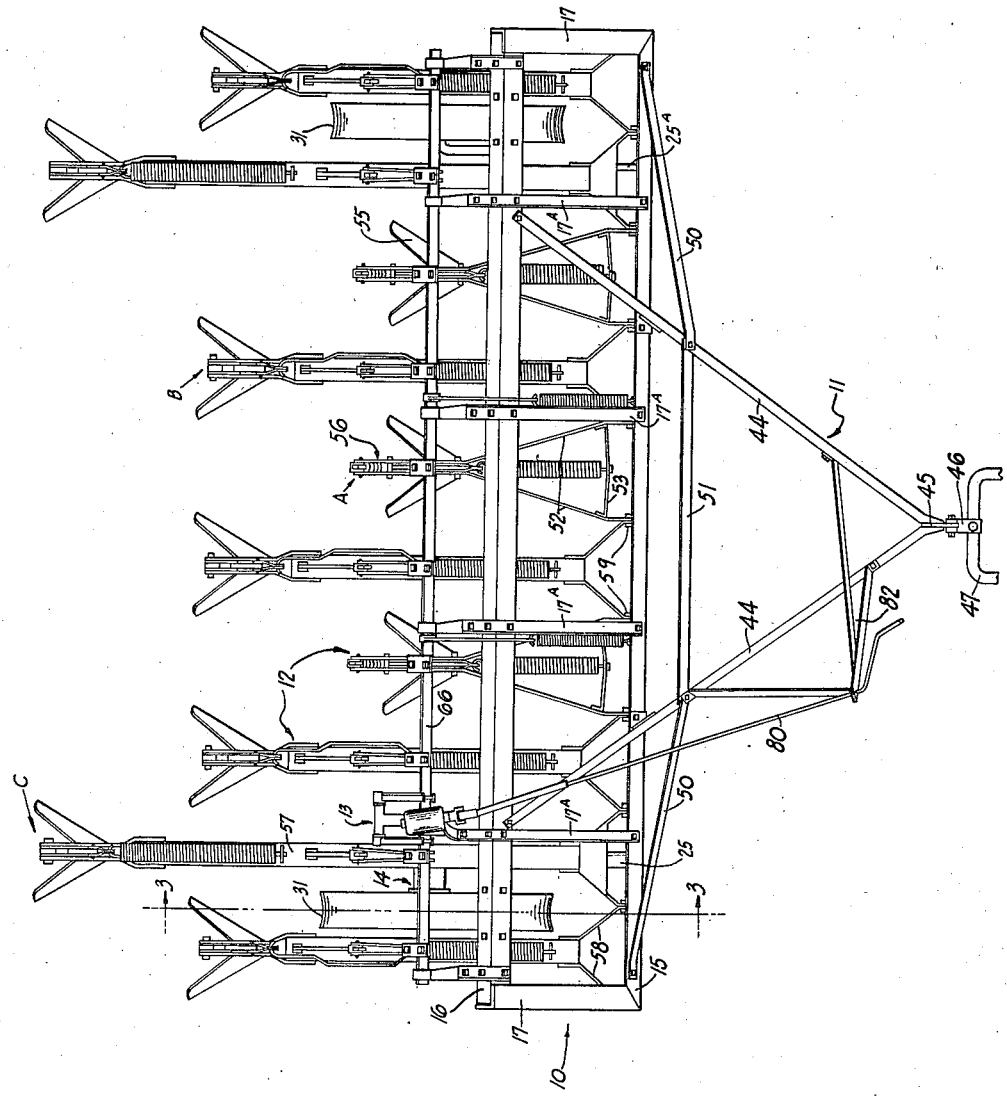
Figure 1 is a plan view of the novel field cultivator.
Figure 2:
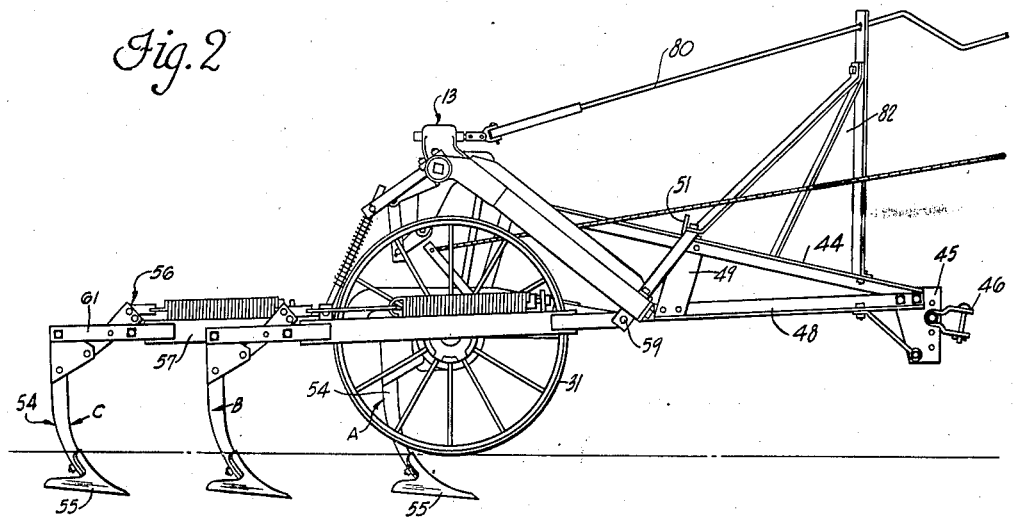
Figure 2 is a side view of the machine shown in Figure 1.

Referring now to the drawings, more particularly to Figures 1 and 2, it will be seen that the novel field cultivator construction chosen to illustrate the principles of the present invention comprises a transversely disposed rectangular frame 10, a draft means 11 which extends forwardly of the frame 10, cultivator rigs 12 which are movably mounted on the frame 10, a manually controlled constant height depth regulator 13 for adjusting and lifting and lowering the rigs, and a power-lift mechanism 14 for raising and lowering the rigs 12 by power.

Figure 3:
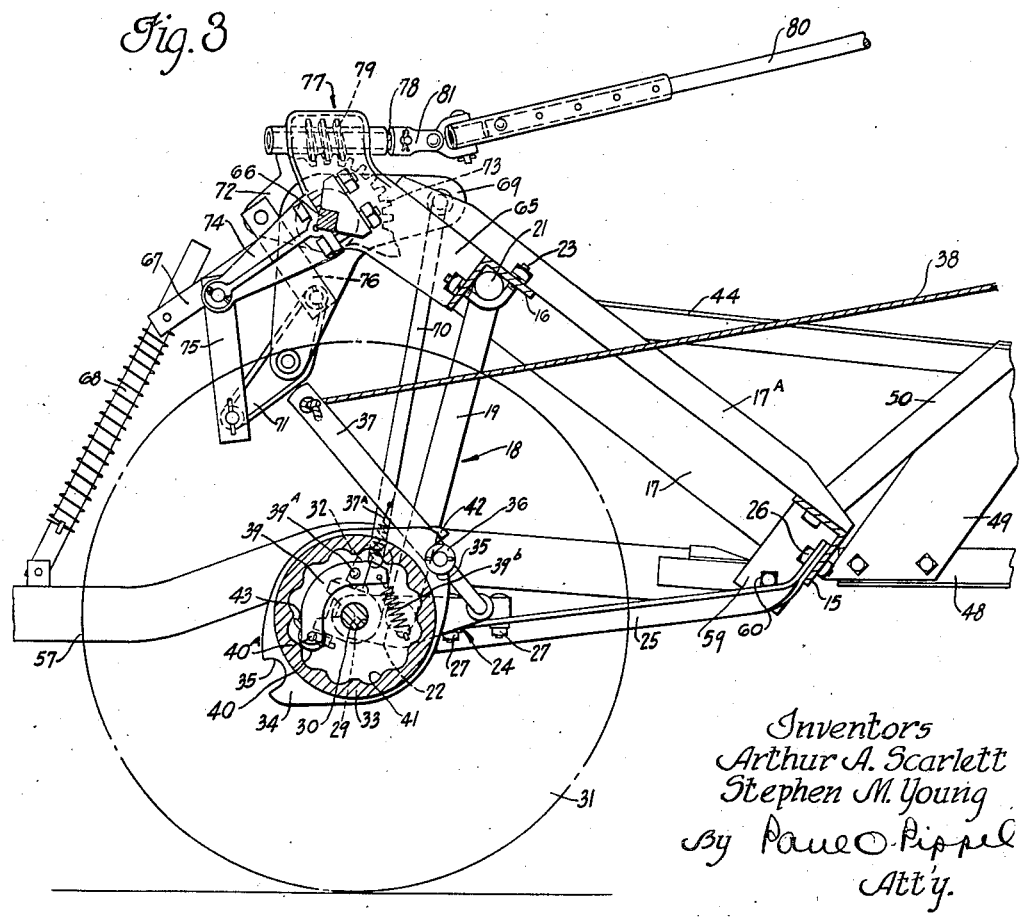
Figure 3 is a sectional side view of the machine taken along the line 3—3 of Figure 1 and shows the novel manually controlled constant height depth regulator, the power-lift mechanism, and the cultivator rigs in an operating position.

The rectangular frame 10 comprises front and rear transverse angle members 15 and 16 which are secured together in spaced relation by longitudinal end angle members 17 and intermediate longitudinal angle members 17a. As shown in Figure 2, the frame 10 is normally positioned in a downwardly and forwardly inclined position. Inwardly from each end of the frame is mounted a novel wheel supporting means 18 which comprises a U-shaped member 19 having spaced substantially parallel portions 21 and 22. The portion 21 is fitted between the legs of the rear angle member 16 and secured thereto by means of the bolts 23. At the right side of the machine the other portion 22 is secured to a casting 24. At the left side of the machine a supporting wheel 31 is journaled on the portion 22. As shown in Figures 1 and 3, the members 19 extend downwardly and rearwardly and are held in this position by a longitudinally positioned brace 25 at the right side of the machine which is secured at its front end to the front transverse angle member 15 by a bolt 26 and at its rear end to the casting 24 by the bolts 27. The member 19 at the left side of the machine has a similar brace 25a which is connected to the front transverse angle 15 and the portion 22.

The casting 24 has a portion 28 provided with a transverse opening 29 in which a shaft 30 is journaled. The ends of the shaft 30 extend beyond each side of the portion 28. At one end of the shaft 30 is rotatably mounted a supporting wheel 31, and at the other end is secured an arm 32. The power-lift mechanism 14 is mounted adjacent and driven from the supporting wheel 31 at the right side of the machine. As shown in Figure 3, the power-lift mechanism 14 is of the half revolution clutch type and comprises a driver member 33 which encircles the shaft 30 and which is secured in any desired manner to the hub of the wheel 31. A driven member 34 also encircles the shaft 30 but is rotatably mounted thereon adjacent the driver member 33. The outer periphery of the driven member 34 has diametrically opposed recesses 35 provided therein, into one of which a roller 36 mounted on a lever 37 is adapted to fit. The lever 37 is pivotally mounted on the casting 24 and is urged into engagement with the outer periphery of the driven member 34 by a spring 37a connected between the lever 37 and the casting 24. A rope 38 connected to the upper end of the lever 37 extends forwardly within reach of the operator.

An arm 39 is pivotally mounted on a pin 39a on the driven member 34, and a roller 40 journaled on a pin 40a at one end thereof is adapted to seat itself in one of a plurality of recesses 41 provided around the inner portion of the driver member 33. A spring 39b connected to the arm 39 and the driven member 34 urges the roller 40 into engagement with the recesses 41. The roller 40, however, is normally held out of engagement with the recesses 41 by means of a lever 42 which is positioned on the other side of the driven member 34 and pivotally mounted on the pin 39a. The pin 40a on which the roller 40 is rotatably mounted extends through an opening 43 provided in the driven member 34 and is connected to the lever 42. As shown in Figure 3, the lever 42 extends slightly beyond opposite sides of the recesses 35 so that, when the roller 36 on the lever 37 seats itself in one of the recesses 35, the lever 42 will move the roller 40 out of engagement with one of the recesses 41 and hold the driven member 34 against rotation. The operation of the power-lift mechanism will be described in detail later on.

A suitable draft means 11 extends forwardly from the frame 10 and comprises a pair of upper members 44 which are connected at their rear ends to the rear angle member 16 near the outer ends thereof. The members 44 converge forwardly, and their front ends are secured to a vertical plate 45 on which is connected a clevis 46 that may be connected to any suitable source of power such as a tractor draw-bar 47, as shown in Figure 1. A pair of lower angle members 48 are connected at their rear ends to the front transverse angle member 15. The members 48 converge forwardly also and are connected at their front ends to the vertical plate 45. Vertical plates 49 connected to the lower members 48 and the upper members 44 reinforce the members. The entire draft means 11 is stabilized by the transverse end braces 50 connected to the angle member 15 and the upper members 44 and the transverse central brace 51 connected to the upper members 44.

The cultivator rigs 12 are movably mounted on the frame 10 and comprise a plurality of short rigs A, a plurality of intermediate length rigs B, and a plurality of long rigs C. The short rigs A comprise a pair of draw-bars 52 which are held in spaced relation at their front end by a transverse bar 53. The rear ends of the draw-bars 52 converge and a vertical tool standard 54 is pivotally connected thereto. A cultivator shovel 55 is secured to the end of the standard 54, and a trip mechanism 56 is operatively connected to the rear ends of the draw-bars and the tool standard in such a manner as to allow the tool standard to move rearwardly in the event the shovel 55 strikes an obstruction. Since the intermediate and long rigs are constructed alike, only the long rig will be described. The long rig C comprises a draw-bar made from a tubular member or section of pipe 57 which is arranged longitudinally of the machine. At the front end of the pipe 57 is secured a pair of outwardly extending members 58. As shown in Figure 1, the members 58 of the long and intermediate rigs and the draw-bars 52 all extend to the same width. This is desirable because the rigs have increased torsional rigidity and may be readily connected to the frame 10. The rigs are connected to the brackets 59 which are secured to the front transverse angle member 15. Referring to Figure 1, it will be noted that the brackets are mounted in pairs in equally spaced relation along the member 15, and the members 58 and the draw-bars 52 are pivotally connected between a pair of the brackets 59 by the bolts 60.

At the rear of the pipe is secured a pair of members 61 between which is pivotally connected one of the vertical tool standards 54. A cultivator shovel 55 is also secured to the end of the standard 54, and a trip mechanism 56 is operatively connected to the members 61 and the standard 54 in such a manner that in the event the shovel strikes an obstruction the standard may move rearwardly. The pipe construction for the longer type rigs is desirable, since it is much stronger and has a greater resistance to torsional stress. When spring teeth are used a novel attaching member is provided on the pipe. This construction is shown in Figures 6 and 7 and comprises a tubular member 57a to which attaching members 62 are secured. The members 62 consist of an upwardly extending portion 62a and an outwardly extending portion 62b. The upwardly extending portions 62a of the members 62 are welded to the tubular member 57a in such a manner that the outwardly extending portion 62b of one of the members 62 extends to one side thereof, and the outwardly extending portion of another of the members 62 extends to the other side thereof. On the outwardly extending portions 62b spring teeth 63 are clamped. Since one of the members 62 is secured to the end of the pipe 57a, a plug 64 is welded to the end of the pipe to strengthen the end thereof.

The cultivator rigs are adjusted and raised and lowered by the novel manually controlled constant height depth regulator 13 which is carried on the frame 10. From the rear of the frame 10 extends a plurality of brackets 65. The outer brackets 65 are secured to the rear transverse angle 16, and the intermediate brackets 65 are secured to the rear transverse angle 16 and the rear ends of the longitudinal members 17a. A rock-shaft 66 is journaled in the brackets 65. Lifting arms 67 are secured to the rock-shaft 66 in alinement with each of the cultivator rigs 12, and a link 68 connects the lifting arms 67 and the rigs 12.

A regulator 13 is associated with the rock-shaft and comprises a bell-crank 69 which is journaled on the rock-shaft 66. A substantially vertical link 70 connects one arm of the bell-crank 69 with the lifting arms 32 on the shaft 30. A member 71 is pivotally mounted intermediate its ends on the other arm of the bell-crank 69, as shown in Figure 3. A part 72 having a gear portion 73 is journaled on the rock-shaft 66, and an adjusting arm 74 is secured to and extends rearwardly of the rock-shaft 66. A first link 75 connects the adjusting arm 74 with one arm of the member 71, and a second link 76 connects the part 72 with the other arm of the member 71. It is to be noted that the bracket 65 near the regulator 13 has a portion 77 in which a shaft 78 is journaled, on which is secured a worm gear 79 that is adapted to engage the gear portion 73 of the part 72. A manually adjustable crank 80 is connected to the shaft 78 by a universal joint 81. The crank 80 extends forwardly to the front of the hitch 11 and is supported in a structure 82 mounted on the hitch 11. By this construction, the crank 80 is within reach of the operator so that he may readily adjust the rigs 12.

As previously mentioned, the cultivator rigs 12 in Figure 3 are shown in an operating position, and Figure 4 shows the cultivator rigs 12 in a raised or transport position. When the rigs are in an operating position, it is desirable many times that they be adjusted to various working depths. This adjustment is made by rotating the crank 80 to the left or to the right. When the crank 80 is rotated, the worm 79 rotates the part 72 which in turn, through the links 76 and 75 and the member 71, rotates the arm 74 which in turn rotates the rock-shaft 66, since the arm 74 is secured to the rock-shaft. The rotation of the rock-shaft 66 moves the lifting arms 67, which through the links 68 adjusts the rigs 12. It is to be noted that bell-crank 69 does not move when the rigs are adjusted. The movement of the part 72 through the second link 76 moves the member 71 about its pivotal connection to one arm of the bell-crank 69. The member 71 in turn moves the link 75 which is connected to the adjusting arm 74 and aids in rotating the rock-shaft 66.

However, when it is desired to raise the rigs 12 by the power-lift mechanism 14, the bell-crank 69 is moved by the link 70. The rigs 12 may be in any desired operating position. Upon pulling the rope 38, the lever 37 moves about its pivotal connection to the casting 24, and the roller 36 moves out of the recess 35 in the driven member 34. The lever 42 and the arm 39 are moved by the spring 39b about their pivotal mounting until the roller 40 engages one of the recesses 41 which locks the driven members 34 to the driver member 33. The forward movement of the machine through the wheel 31 rotates the shaft 30 until the roller 36 seats itself in the other recess 35. This rotation of the shaft 30 moves the arm 32 into the position shown in Figure 4 and, through the link 70, moves the bell-crank 69 which in turn, through the first link 75 and the member 71, rotates the rock-shaft 66 to raise the rigs 12. When the rigs are to be lowered, the rope is pulled again and the rigs 12 drop to the ground.

From the foregoing description it should be apparent that a novel field cultivator construction has been provided which accomplishes all of the desirable objects previously set forth. Two of these cultivators may be readily connected together in end to end relation, since the supporting wheels for their frames are set inwardly from the ends thereof. The cultivator rigs may be quickly adjusted to any desired depth and raised to a constant height by the novel manually controlled constant height lift depth regulator and the power-lift mechanism. The novel cultivator rig construction makes possible a much lighter, yet stronger rig.

While only a preferred construction embodying the principles of the present invention has been shown and described, it is to be understood that the invention is not to be limited to the specific details shown and described, but that, in fact, widely different means may be employed in the practice of the broader aspects of the present invention.

What is claimed is:

1. A cultivator comprising a downwardly and forwardly inclined rectangular frame, wheel supporting means connected to and spaced inwardly from the ends of the frame, axles extending from the wheel supporting means, a wheel journaled on each of the axles, a half-revolution clutch mounted on one of the axles adjacent the wheel journaled thereon, a plurality of cultivator rigs movably mounted on the frame, a rock-shaft rotatably mounted on the frame, link means connecting the cultivator rigs and the rock-shaft, manually adjustable means associated with the rock-shaft for adjusting the depth of the cultivator rigs, and a substantially vertical link connecting the clutch and the rock-shaft for raising and lowering the cultivator rigs.

2. In combination, an inclined frame, a plurality of cultivator rigs pivotally connected to the frame, draft means extending forwardly of the frame, depending wheel supporting members connected to and spaced inwardly from the ends of the frame, wheels journaled on the members, a power-lift mechanism mounted adjacent and operated from one of the wheels, a rock-shaft rotatably mounted on the frame, a manually controlled constant height lift depth regulator associated with the rock-shaft and comprising a bell-crank journaled on the rock-shaft, a link connecting one arm of the bell-crank with the power-lift mechanism, a member pivotally connected intermediate its ends on the other end of the bell-crank, an adjusting arm extending from the rock-shaft, a first link connecting one end of the member with the adjusting arm, a part having a gear portion journaled on the shaft, a worm gear carried by the frame and engaging the gear portion of the part, manual means associated with the worm gear for moving the part, a second link connecting the member with the part, a plurality of lifting arms extending from the rock-shaft, and links connecting the lifting arms and the cultivator rigs.

3. In combination, a frame, a plurality of cultivator rigs pivotally connected to the frame, draft means extending forwardly of the frame, carrying wheels for the frame, a power-lift mechanism mounted adjacent and operated from one of the wheels, a rock-shaft rotatably mounted on the frame, a manually controlled constant height lift depth regulator associated with the rock-shaft and comprising a bell-crank journaled on the rock-shaft, a link connecting one arm of the bell-crank with the power-lift mechanism, a member pivotally connected intermediate its ends on the other end of the bell-crank, an adjusting arm extending from the rock-shaft, a first link connecting one end of the member with the adjusting arm, a part having a gear portion journaled on the shaft, a worm gear carried by the frame and engaging the gear portion of the part, manual means associated with the worm gear for moving the part, a second link connecting the member with the part, a plurality of lifting arms extending from the rock-shaft, and links connecting the lifting arms and the cultivator rigs.

4. In combination, a frame, a plurality of cultivator rigs pivotally connected to the frame, carrying wheels for the frame, a power-lift mechanism mounted adjacent and operated from one of the wheels, a rock-shaft rotatably mounted on the frame, a manually controlled constant height lift depth regulator associated with the rock-shaft and comprising a bell-crank journaled on the rock-shaft, means connecting one arm of the bell-crank with the power-lift mechanism for raising and lowering the frame, a plurality of lifting arms extending from the rock-shaft, means connecting the lifting arms with the cultivator rigs, an adjusting arm secured to the rock-shaft, and manually adjustable means carried by the frame and operatively connected to the other end of the bell crank and the adjusting arm for adjusting the working depth of the cultivating rigs.

5. A manually controlled constant height lift depth regulator for an implement having a movable part that is to be moved by power in one direction to a predetermined position and moved to another position in which it may be adjusted comprising a rotatable shaft, a bell-crank journaled on the shaft, an adjusting arm extending from the shaft, a part journaled on the shaft, manually adjustable means operatively connected to the arm for adjusting the arm, means connecting the part, one arm of the bell-crank, and the adjusting arm in such a manner that upon operation of the manually adjustable means said means will move the adjusting arm and not the bell-crank, means connecting the movable part of the implement and the shaft, and means operatively connected to the other end of the bell-crank for moving said movable part of the implement to its predetermined position.

6. A cultivator comprising a forwardly and downwardly inclined frame, wheel supporting means connected to and spaced inwardly of the frame, axles journaled in the supporting means, wheels mounted on the axles, a half-revolution clutch power-lift driven by and mounted on one axle adjacent its wheel, a plurality of cultivator rigs pivotally connected to the frame, a rotatable shaft carried by the frame, lifting arms extending from the shaft, links connecting the lifting arms and the cultivator rigs, a bell-crank journaled on the shaft, link means connecting one arm of the bell-crank and the power-lift for moving the bell-crank to two predetermined positions, link means operatively connected to the other end of the bell-crank and the shaft for adjusting said shaft to effect adjustment of the rigs, and manually adjustable means operatively connected to the link means for adjusting said link means to effect adjustment of the cultivator rigs.

7. A cultivator comprising a downwardly and forwardly inclined rectangular frame, wheel supporting means connected to and spaced inwardly from the ends of the frame, axles extending from the wheel supporting means, a wheel journaled on each of the axles, a half-revolution clutch mounted on one of the axles adjacent the wheel journaled thereon, a plurality of cultivator rigs movably mounted on the frame, a movable member mounted on the frame, link means connecting the cultivator rigs and the movable member, manually adjustable means associated with the movable member for adjusting the depth of the cultivator rigs, and a substantially vertical link connecting the clutch and the movable member for raising and lowering the cultivator rigs.

8. A constant height lift depth regulator for an implement having an element that is to be moved by power in one direction to a predetermined position and moved to another position in which it may be adjusted, comprising a rockable part, means connecting the rockable part and the element, a first member affixed to said rockable part for movement therewith, a second member mounted on the part for independent movement with respect thereto, a third member mounted on the part for independent movement with respect thereto, means operatively connecting said third member to said first member for movement thereof, means operatively connecting said second member to said first member for movement thereof, means for moving said third member to effect movement of said first member without moving said second member, and means for moving said second member to effect movement of said first member.

9. A constant height lift depth regulator for an implement having an element that is to be moved by power in one direction to a predetermined position and moved to another position in which it may be adjusted, comprising a rockable part, means connecting the rockable part and the element, a first member affixed to said rockable part for movement therewith, a second member mounted on the part for independent movement with respect thereto, a third member mounted on the part for independent movement with respect thereto, common means connecting said first and third members to said second member, means for moving said third member to effect movement of said first member without moving said second member, and means for moving said second member to effect movement of said first member.

10. A constant height lift depth regulator for an implement having an element that is to be moved by power in one direction to a predetermined position and moved to another position in which it may be adjusted, comprising a rockable part, means connecting the rockable part and the element, a first member affixed to said rockable part for movement therewith, a second member mounted on the part for independent movement with respect thereto, a third member mounted on the part for independent movement with respect thereto, means operatively connecting said third member to said first member for movement thereof, means operatively connecting said second member to said first member for movement thereof, manually operable means for moving said third member to effect movement of said first member without moving said second member, and power means operable independently of said manually operable means for moving said second member to effect movement of said first member.

ARTHUR A. SCARLETT.
STEPHEN M. YOUNG.